United States Patent Office 3,274,131
Patented Sept. 20, 1966

3,274,131
POLYMERIC COMPOSITIONS HAVING PERCHLOROCOUMALIN CHEMICALLY COMBINED THEREIN
Edward Leon, Tonawanda, N.Y., assignor to Hooker Chemical Corporation, Niagara Falls, N.Y., a corporation of New York
No Drawing. Filed Mar. 4, 1963, Ser. No. 262,371
18 Claims. (Cl. 260—2.5)

This application is a continuation-in-part of co-pending application Serial No. 731,851, filed April 30, 1958, now U.S. Patent 3,092,641.

This invention relates to novel polymeric compositions and to processes for preparing them. The invention also relates to fire-retardant polymeric compositions that contain combined chlorine. In other aspects, the invention relates to novel epoxy resins, polyester resins, crosslinked or thermoset resinous products and to cellular or foamed products.

The polymeric compositions of this invention are useful in the preparation of castings, laminates, and molded articles. The cellular products of the invention are useful in the construction industry, for example, in producing building panels and the like where the low density of the compositions are an important advantage.

The co-pending application describes various Diels-Alder reactions of perchlorocoumalin and olefinic compounds. These reactions can be exemplified by the following series of equations when maleic anhydride is used as the dienophile.

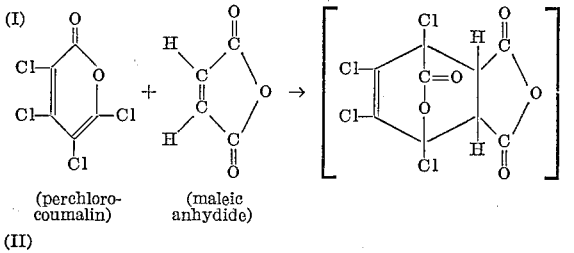

(perchlorocoumalin)   (maleic anhydride)

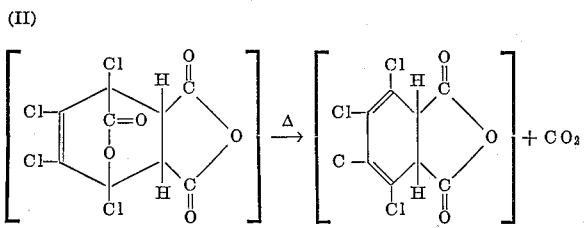

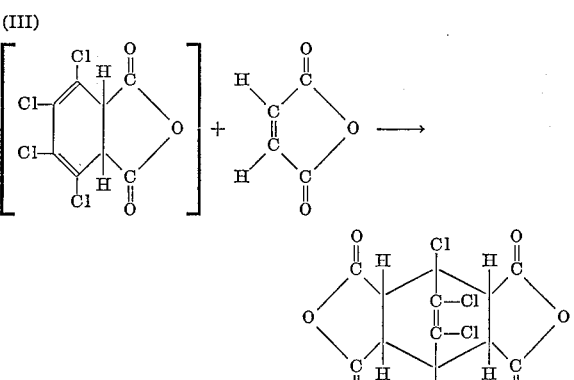

With maletic anhydride, the reaction generally proceeds directly to the final product, i.e., the double Diels-Alder reaction; however, if the intermediate compounds can be isolated, they can be made to enter into a second Diels-Alder reaction with any organic olefin of the class described herein. The reaction product of one mole of perchlorocoumalin per mole of dienophile is designated a mono-adduct; the reaction product of one mole of perchlorocoumalin per two moles of dienophile is designated a di-adduct. This reaction can be utilized to prepare useful polymeric compositions by several methods to be described hereinafter.

It is an object of this invention to provide novel polymeric compositions and processes for producing said compositions.

Another object of the invention is to provide novel epoxy resinous compositions.

Still another object of the invention is to provide novel polyester resins.

A further object of the invention is to provide novel thermoset polymeric compositions.

An additional object of the invention is to provide cellular polymer products.

Still another object of the invention is to provide polymeric compositions useful in the preparation of castings, laminates, molded articles, potting compounds, as well as in the preparation of cellular or foamed products. These and other objects of the invention will become more apparent upon consideration of the following detailed specification.

In accordance with this invention, there are provided organic polymeric compositions having chemically combined therein a Diels-Alder adduct of perchlorocoumalin and an olefinic compound selected from the group consisting of alkenes, cycloalkenes having up to 2 fused rings, carboxylic compounds containing aliphatic carbon-to-carbon unsaturation, and mixtures thereof.

In one aspect of the invention, the perchlorocoumalin is first reacted with a carboxylic compound containing aliphatic carbon-to-carbon unsaturation to form a Diels-Alder adduct, and thereafter said adduct is reacted to form a polymeric material. In one embodiment of the invention, the Diels-Alder adducts of perchlorocoumalin and carboxylic compounds are used as curing agents or hardeners for epoxy resins. In another embodiment of the invention, the adducts of perchlorocoumalin and carboxylic compounds are reacted with polyols to form polyester resins. In a further embodiment of the invention, unsaturated compounds are also utilized in the preparation of such polyester resins, which can subsequently be cross-linked with unsaturated monomers to form thermoset products. In still a further embodiment, the polyesters of the invention can be reacted with polyisocyanates in the presence of a foaming agent to produce cellular reaction products (polyurethane foams).

In another aspect of the invention, the perchlorocoumalin is adducted directly with carbon-to-carbon double bonds of polymeric molecules. In one such embodiment, perchlorocoumalin is adducted with an unsaturated polyester resin containing aliphatic carbon-to-carbon double bonds to provide a polyester resin having chemically combined chlorine. In another embodiment, perchlorocoumalin is adducted with other types of unsaturated polymers having olefinic unsaturation, such as polybutadiene. In a further embodiment of the invention, thermoset polymer products are produced by cross-linking unsaturated polyester resins or other unsaturated polymers with perchlorocoumalin by a Diels-Alder reaction that joins two or more polymer molecules. In still another embodiment of the invention, cross-linking of unsaturated polymers is carried out in the presence of the carbon dioxide formed in the Diels-Alder adduction of perchlorocoumalin with olefinic compounds in such a manner that cellular products result.

Many carboxylic compounds containing aliphatic carbon-to-carbon unsaturation can be reacted with perchlorocoumalin by the Diels-Alder reaction. These include the carboxylic acids, the carboxylic anhydrides, the carboxylic acid esters, and the carboxylic acid halides. The preferred carboxylic compounds are the aliphatic, alpha, beta-unsaturated carboxylic compounds containing up to 20 carbon atoms. Suitable carboxylic compounds are maleic acid, chloromaleic acid, ethyl maleic acid, fumaric acid, itaconic acid, mesaconic acid, citroconic acid, acrylic acid, methacrylic acid, crotonic acid, ethacrylic acid, propacrylic acid, pentenoic acid, hexenoic acid, methylpentenoic acid, chloroacrylic acid, xeronic acid, pyrocinchoninic acid, oleic acid, linoleic acid, and the corresponding anhydrides acid halides and acid esters, such as maleic anhydride, fumaryl chloride, methyl acrylate, dimethyl fumarate, and the like.

Mixed adducts can be formed by reacting one mole of perchlorocoumalin with one mole of an olefinic hydrocarbon, such as an alkene or cycloalkene to form a mono-adduct, followed by reacting the mono-adduct with a carboxylic compound of the type described hereinbefore to form the mixed di-adduct. Alkenes and cycloalkenes suitable for this purpose are ethylene, propylene, allylene, butadiene, 2,3-dimethylbutadiene, isoprene, chloroprene, octadiene, cyclohexene, styrene, cyclopentadiene, dicyclopentadiene, bicycloheptadiene, and the like. When adducts of perchlorocoumalin and carboxylic compounds are mentioned in this specification, it is understood that the mixed adducts of the character just described can also be used.

The adduction process is preferably carried out in a liquid phase either with or without a solvent. The reaction temperature is a function of the particular dienophile employed. For example, when perchlorocoumalin is reacted with maleic anhydride, a temperature of at least about 130 degrees centigrade is used so that the reaction will proceed at a satisfactory rate. Temperatures above about 200 degrees centigrade are generally avoided because perchlorocoumalin undergoes a gradual decomposition and/or rearrangement above that temperature. The use of super atmospheric pressures, generally up to about two hundred atmospheres, is desirable when volatile dienophiles are employed at elevated temperatures. The time required for the reaction is at least partially dependent on the temperature, pressure, concentration, and whether or not a solvent is used. Accordingly, the time can vary from a few minutes to several days. The process is generally conducted using the theoretical molar ratios of perchlorocoumalin and dienophile, but the rate of reaction can be increased in some cases by using an excess of one of the reactants.

The epoxy resins that are useful in this invention are any of those materials falling in this well known class of resins. Included within this classification are resins such as the reaction products of a dihydric phenol and a halohydrin, epoxidized hydrocarbons, epoxidized vegetable oils, as well as naturally occurring materials of the same type containing the oxirane ring structure. By the terms "epoxy group or resin, epoxide or polyepoxide" as used herein is meant a group or compound which contains adjacent carbon atoms to which oxirane oxygen is attached, e.g.,

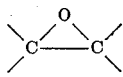

The epoxy resins that are the reaction products of a dihydric phenol and halohydrin are generally obtained by reacting at a temperature of about 50 to 150 degrees centigrade at least one mole of the halohydrin with one mole of the dihydric phenol in the presence of an alkali metal hydroxide such as sodium and potassium hydroxide, or an alkaline earth hydroxide such as calcium and barium hydroxide. It is preferred to use an excess of base, e.g., from about 1.1 to about 1.3 equivalents of base per mole of epihalohydrin. The reaction is carried out in an aqueous medium by first mixing the dihydric phenol and the base in water, followed by heating the mixture. The epihalohydrin is then added to the mixture and heating is continued with agitation for several hours to convert the reactants to an epoxy resin. The heated reaction product is washed with water to remove the base. Typical halohydrins that can be used in the preparation of the resins include monohalohydrins, such as 3-chloro-1,2-propane diol; polyhalohydrins, such as glycerol dichlorohydrin, 1,4-dichloro-2,3-dihydroxy butane, and the like; and epihalohydrins such as epichlorohydrin. Typical polyhydric phenols include the mono-nuclear phenols such as resorcinol, catechol, hydroquinone, phloroglucinol, and the like; as well as the poly-nuclear phenols such as the 2,2'; 2,3'; 2,4'; 3,3'; 3,4'; and 4,4'-isomers of dihydroxy diphenylmethane, dihydroxy diphenyl dimethylmethane, dihydroxy diphenyl ethylmethyl methane, dihydroxy diphenyl methylpropyl methane, dihydroxy diphenyl ethylphenyl methane, dihydroxy diphenyl cyclohexyl methane, polyhydric phenol formaldehyde condensation products and the like.

Another type of useful epoxy resin is formed by epoxidizing unsaturated hydrocarbons. Typical hydrocarbons useful for this purpose are the olefin polymers such as polyethylene, polypropylene, polybutadiene, copolymers of olefinic monomers such as ethylenepropylene copolymer and the like. This class of epoxy resin is prepared, for example, by reacting the unsaturated polyolefin with a suitable reactant such as acetyl peroxide for several hours at elevated temperature. This class of epoxy resin not only bears the characteristic epoxide structure, but also has other functionality such as ethylenic unsaturation. The presence of such reactive double bonds means that these resins can be cured not only by the conventional epoxy curing agents set forth hereinafter, but also can be cured by peroxide catalysts such as dicumyl peroxide and benzoyl peroxide as well, and can also be reacted with ethylenically unsaturated monomers such as styrene, vinyl toluene, methylmethacrylate and the like.

Another type of epoxy resin useful in this invention are the polyepoxides derived from naturally occurring vegetable oils, or their derivatives. Examples of these are epoxidized triglyceride such as epoxidized soybean oil, epoxidized linseed oil, epoxidized cottonseed oil, epoxidized glycerol trioleate, and the like; epoxidized diglycerides, such as epoxidized glycerol dioleate, epoxidized glycerol dilinoleate, epoxidized glycerol dilinolenate, and the like; epoxidized monoglycerides such as epoxidized glycerol monolinoleate, and the like; alkyl esters of epoxidized fatty acids such as epoxidized methyl linoleate, epoxidized ethyl linoleate, and the like. Such materials are prepared, e.g., by agitating the compound to be epoxidized with a peracetic acid solution, prepared from glacial acetic acid, 30% hydrogen peroxide and 1 percent sulfuric acid catalyst. The agitation is usually continued for several hours at elevated temperatures. The resulting epoxy compositions can be subsequently purified.

Curable mixtures are obtained by mixing an adduct of perchlorocoumalin and a carboxylic compound, preferably an acid or anhydride, with the epoxy resin and any desired additives. Catalysts can also be employed. Suitable catalysts which can be employed to promote the curing of the epoxy resin compositions include basic and acidic catalysts. Typical basic catalysts are dimethylamino methylphenol, α-methylbenzyl dimethylamine, tri-n-butyl amine, benzyldimethylamine, and benzyltrimethylammonium hydroxide. Suitable acidic catalysts include mineral acids such as sulfuric acid, phosphoric acid, perchloric acid, and various sulfonic acids such as toluene sulfonic acid and the like; and the metal halide Lewis acids, such as stannic chloride, zinc chloride, borontrifluoride, and the like. Various complexes of the metal halide catalysts can also be employed. Sometimes, it is desirable to employ the catalyst in solution in a suitable solvent. Typical solvents for use with the basic catalysts include water and dioxane. Typical solvents for the acidic catalysts include organic ethers such as diethyl ether, organic esters such as methylacetate, organic ketones such as acetone, and the like. The mineral acids can be employed as solutions in water. Catalyst concentrations can be varied over a wide range depending on the particular catalyst, the rate of cure desired, and the curing temperature to be used. Catalyst concentration generally varies from about 0.1 to 20 weight percent based on the weight of the epoxy composition.

Other types of curing agents can be employed together with the perchlorocoumalin adducts. Suitable auxiliary curing agents are those organic compounds which contain two or more groups per molecule which are reactive with epoxy groups and include the following classes of compounds: polycarboxylic acids, polycarboxylic acid anhydrides, polyfunctional amines, polyhydric phenols, as well as mixtures such as polycarboxylic acid anhydride-polyol mixtures; as well as certain other compounds such as mercapto acids, polyisocyanates, polythioisocyanates, polyacyl halides, hydroxy carboxylic acids and the like.

The relative amounts of curing agent (including the perchlorocoumalin adducts) in the epoxide composition can be varied considerably. It is preferred to employ an amount of curing agent which contains a sufficient number of epoxy-reactive groups to react with approximately all of the epoxy groups in the epoxide composition, but higher and lower amounts of curing agent, for example as low as 0.5 epoxy-reactive group per epoxide, can be employed if desired. The curing temperature is preferably in the range of about 20 to about 200 degrees centigrade, but temperatures up to about 250 degrees centigrade can be employed.

The polyester resins contemplated in the practice of the invention are the reaction products of polycarboxylic compounds and polyhydric alcohols. The polycarboxylic compounds are the polycarboxylic acids, polycarboxylic acid hydrides, polycarboxylic acid halides, and polycarboxylic acid esters. These compounds can be aliphatic, cycloaliphatic, aromatic, or heterocyclic, saturated or unsaturated, and preferably contain up to about twenty carbon atoms per molecule. Suitable polycarboxylic acids and the corresponding acid halides, acid esters, and acid anhydrides include maleic, chloromaleic, ethyl maleic, itaconic, citraconic, xeronic, pyrocinchoninic, acetylene dicarboxylic, phthalic, isophtnalic, terephthalic, tetrachlorophthalic, adipic, succinic, chlorendic, and mixtures thereof. The preferred polyhydric alcohols can be aliphatic, cycloaliphatic, aromatic, or heterocyclic, saturated or unsaturated, and preferably contain up to about twenty carbon atoms per molecule. Suitable polyhydric alcohols include butenediol, pentenediol, the unsaturated hydroxy ethers such as allyl or vinyl pentaerythritol ethers, ethylene glycol, diethylene glycol, propylene glycol, dipropylene glycol, polypropylene glycol, butanediol, dibutylene glycol, pentanediol, hexanediol, glycerol, mannitol, sorbitol, trimethylolethane, trimethylolpropane, hexanetriol, cyclohexanediol-1,4, hydroxy-ethylated bisphenol-A, and the like.

The temperature for the reaction between polyhydric alcohol and polycarboxylic compounds ranges from about 100 to 200 degrees centigrade, although higher and lower temperatures can be employed, for example up to 250 degrees centigrade. Esterification catalysts such as paratoluene sulfonic acid, benzene sulfonic acid, betanaphthalene sulfonic acid, and the like, or amines such as pyridine, triethylamine, quinoline, and the like can be added to the reaction mixture. The proportion of polyhydric alcohol is approximately controlled by the total mole proportion of polycarboxylic compounds in the esterification reaction mixture. It is also preferred to react the polyhydric alcohols and polybasic compounds in roughly equimolar proportions, however, either the acids or alcohols can be employed in substantial excess, if it is desired to form a low molecular weight polyester resin.

When it is desired to prepare polyester resins utilizing the adducts of perchlorocoumalin and carboxylic compounds, various combinations of the foregoing polyhydric alcohols and polycarboxylic compounds can be employed in the reaction mixture depending on the end use desired for the polyester resin. For example, a polyester can be prepared by merely reacting the adduct of perchlorocoumalin with one of the foregoing polyhydric alcohols. If ethylenic unsaturation is desired in the polyester molecule, one of the foregoing unsaturated polycarboxylic compounds or unsaturated polyhydric alcohols can be employed in the polyesterification mixture. A variety of combinations of saturated and unsaturated polyhydric alcohols and polycarboxylic compounds can be employed to produce polyester resins in a wide variety of properties and uses.

A variety of ethylenically unsaturated monomers can be used for curing or cross-linking the ethylenically unsaturated polyester resins of this invention. The monomers useful in curing the thermoplastic unsaturated polymers include vinylic compounds or mixtures thereof capable of cross-linking ethylenically unsaturated polymer chains at their points of unsaturation. Usually they contain the reactive groups $H_2C=C<$. Specific examples include styrene, chlorostyrenes, methyl styrenes such as alpha methyl styrene, p-methyl styrene, divinyl benzene, indene, unsaturated esters such as: methyl methacrylate, methyl acrylate, diallyl phthalate, triallyl phosphate and other allyl esters, and vinyl touene, diallyl chlorendate, diallyl tetrachlorophthalate, the lower aliphatic esters other than methyl of methacrylic and acrylic acids, ethylene glycol diacrylate, dimethacrylate, diethacrylate, and the like. The monomer can be admixed in the polymer in an amount sufficient to produce a thermoset polymer and the admixture heated to an elevated temperature in the presence of a suitable catalyst to cross-link or cure the polymer. With proper catalyst systems such as cobalt naphthenate and methylethyl ketone peroxide, room temperature cures are obtained.

The proportion of olefinic cross-linking agent to unsaturated polyester resin can be varied within the ultimate limits of each without departing from the scope of the invention, necessary to produce an infusible, insoluble, polyester resin. In general, the concentration of the unsaturated polyester in the olefinic cross-linking agent can vary between about ten and ninety percent. Polymerization catalysts are added to the mixture of unsaturated polyester and olefinic cross-linking agent to effect setting or curing. Catalysts such as benzoyl peroxide, acetyl peroxide, lauryl peroxide, methylethyl ketone peroxide, cumene hydroperoxide and the like are satisfactory. Such catalysts are used in proportions of 0.01 to ten percent of the total resin. The polymerization reaction can also be hastened by adding promoters, such as metals or metal salts, cobalt resonates, cobalt maleate, cobalt naphthenate, and the like, or amines such as dibutylamine, or mercaptans, such as dodecyl mercaptan. These additives are used in proportions similar or smaller to that stated for the catalysts.

The polyesters of the invention can also be employed in the preparation of polyurethane compositions by reacting them with organic polyisocyanates. If the reaction is carried out in the presence of a foaming agent, a polyurethane foam results. For use in preparing polyurethane compositions, it is generally preferred that the polyester resins have a hydroxyl number in the range of about 25 to 900. When rigid polyurethane foams are desired, it is also preferred that at least a portion of the polyhydric alcohols used in preparing the polyester resins contain at least three hydroxyl groups per molecule. It is also within the scope of the invention to mix with the combined chlorine polyester resin of the invention, another hydroxyl-containing polymeric material that can be either a polyester resin comprised of the reaction product of a polycarboxylic compound and a polyhydric alcohol, or a polyether comprised of the reaction product of a 1,2-monoepoxide, such as propylene oxide, and a polycarboxylic compound, a polyhydric alcohol or a polyphenolic compound such as a phenolformaldehyde resin. The polycarboxylic compounds and polyhydric alcohols suitable for use in preparing these auxiliary hydroxyl-containing polymeric materials can be any of such compounds enumerated hereinbefore.

A large number of various organic polyisocyanates can be used. Of the hydrocarbon polyisocyanates, the aryl and alkaryl polyisocyanates of the benzene and naphthalene series are more reactive and less toxic than the aliphatic members. Consequently, the aromatic compounds are preferred in the present invention. The preferred compounds which are at present most readily available commercially are 2,4-tolylene diisocyanate, 2,6-tolylene diisocyanate and crude mixtures thereof. However, others can be used, among them phenyl diisocyanate; alpha-naphthyl diisocyanate; 4-tolylene diisocyanate; n-hexyl diisocyanate; methylene-bis-(4-phenyl isocyanate); 3,3'-bitolylene-4,4'-diisocyanate; 1,3,5-benzene triisocyanate; 2,4,6-tolylene triisocyanate; 2,4,6-monochlorobenzene triisocyanate; 4,4',4''-triphenylmethane triisocyanate; polymethylene polyphenylisocyanate and mixtures thereof. Higher isocyanates are provided by the liquid reaction products of (1) diisocyanates and (2) polyols or polyamines; etc. In addition, isothiocyanates and mixtures of isocyanates may be employed. Also contemplated are the many impure or crude polyisocyanates that are commercially available, such as crude mixtures of methylene bis(4-phenylisocyanate).

Conventional reaction catalysts can also be used in producing the polyurethane compositions. The catalyst employed can be any of the known conventional catalysts for isocyanate reactions, such as tertiary amines, for example, triethylamine, N-methyl morpholine, triethanolamine, etc., or antimony compounds such as antimony caprylate, antimony naphthenate, or antimonous chloride. In addition, tin compounds can be employed such as dibutyltin dilaurate, tri-n-octyltin oxide, hexabutylditin, tributyltin phosphate, or stannic chloride. Rigid or flexible polyurethane foams are thereby obtained. The rigid polyurethane foams utilize a highly branched hydroxyl rich polyester or polyether having a hydroxyl number of between about two hundred and nine hundred and fifty. The flexible polyurethane foams utilize a linear relatively hydroxyl poor polyester or polyether having a hydroxyl number of between about thirty and one hundred. If a polyester or polyether with a hydroxyl number between about one hundred and two hundred is employed, a semi-rigid polyurethane foam is usually obtained.

Any foaming agent commonly used in the art can be employed. Foaming agents in this art are generally those materials that are capable of liberating gaseous products when heated, or when reacted with an isocyanate. Preferably foaming is accomplished by introducing a low boiling liquid into the catalyzed resin. The heat of reaction is then sufficient to expand the mixture to a foam stable enough to retain its shape until the resin gels. Suitable liquids are the fluorochlorocarbons boiling in the range of twenty to fifty degrees centigrade, and mixtures thereof, for example, trichlorofluoromethane, trichlorotrifluoroethane, dichloromonofluoromethane, monochloroethane, monochloromonofluoroethane, difluoromonochloroethane, and difluorodichloroethane.

Another foaming system that is suitable for carrying out the foaming reaction at an elevated temperature is found in United States Patent 2,865,869, which discloses and claims the use of tertiary alcohols in the presence of strong, concentrated acid catalysts. Examples of tertiary alcohols includes: tertiary amyl alcohol; tertiary butyl alcohol; 2-methyl-3-butyn-2-ol; 1-methyl-1-penylethanol; and 1,1,2,2-tetraphenylethanol, etc. Examples of catalysts include: sulfuric acid; phosphoric acid; sulfonic acid; and aluminum chloride; etc. In addition, various secondary alcohols and glycols may be used as: 1-phenyl-1,2-ethanediol; 2-butanol; etc. Generally, secondary alcohols should be used with strong concentrated acid catalysts as above; however, certain secondary alcohols may be used without the acid catalyst, e.g., acetaldol, chloral hydrate, etc. Other foaming agents that may be used include the following: polycarboxylic acids, polycarboxylic acid anhydrides, dimethylol ureas, polymethylol phenols, formic acid and tetrahydroxy methylphosphonium chloride. In addition, mixtures of the above foaming agents can be employed.

In preparing the polyurethane compositions of this invention, the hydroxyl containing polymer and polyisocyanate are preferably reacted in a ratio sufficient to provide about eighty-five to one hundred and fifteen percent of isocyanato groups with respect to the total number of hydroxyl and carboxyl groups present in the hydroxyl-containing polymeric material (and the foaming agent, if one is provided). The reaction temperature generally ranges from about 20 to about 120 degrees centigrade, although higher and lower temperatures can be used.

As disclosed hereinbefore, in accordance with another aspect of the invention, perchlorocoumalin is adducted directly with the carbon-to-carbon double bonds in polymer molecules. For example, a linear polymer which contains carbon-to-carbon double bonds susceptible to a Diels-Alder reaction with perchlorocoumalin can be hardened by cross-linking and foamed simultaneously by the $CO_2$ evolved when the linear polymer is heated with perchlorocoumalin. This process is illustrated by the following equation where "R" designates a linear polymer chain radical:

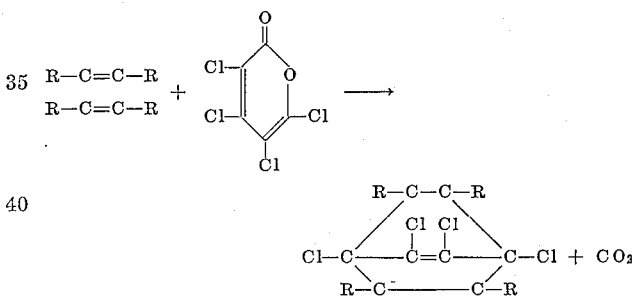

Another example of the application of the Diels-Alder reaction of perchlorocoumalin in the plastics industry is that of producing a liquid linear polymer mix which can be shaped to the desired form and hardned in place by heat without the use of catalysts. This application consists of allowing perchlorocoumalin to react with a linear polymer which contains carbon-to-carbon double bonds and stopping the reaction by cooling just prior to the last Diels-Alder step. This process is illustrated by the following equation:

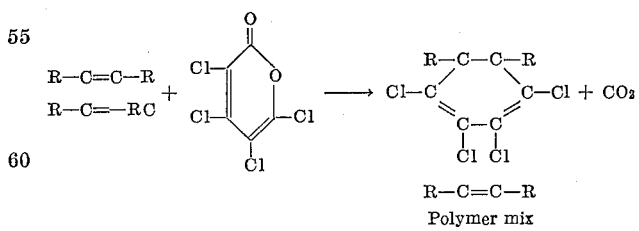

Polymer mix

The fluid polymer mix is then shaped by conventional means, such as placing in a mold, impregnation of a filler, etc., and heated to effect the last Diels-Alder step thereby hardening the polymer by cross-linking. The hardening step is illustrated by the following equation:

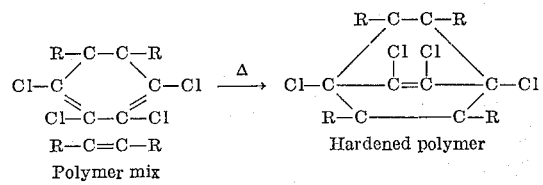

Polymer mix           Hardened polymer

Suitable polymers for use in this aspect of the invention are the unsaturated polyester resins of the type disclosed hereinbefore. Also suitable are any other polymers which contain carbon-to-carbon double bonds that are susceptible to a Diels-Alder reaction with perchlorocoumalin, such as polymers prepared from olefinic hydrocarbons. Typical of such polymers are polybutadiene, polyisoprene, polychloprene, polyallylene, and copolymers such as butadiene-styrene copolymers. Such polymers comprise recurring units of alkenes and the cycloalkenes having up to two fused rings, such as the following: ethylene, propylene, allylene, butadiene, 2,3-dimethyl butadiene, chloroprene, isoprene, octadiene, cyclohexene, styrene, cyclopentadiene, dicyclopentadiene, bicycloheptadiene, and the like. When perchlorocoumalin is adducted with a polymer molecule comprised of such recurring units, it is apparent that the resulting polymeric structure has chemically combined therein a Diels-Alder adduct of perchlorocoumalin and an olefinic compound, such an alkene or cycloalkene having up to two fused rings. In like manner, when perchlorocoumalin is reacted with an unsaturated polyester resin as described hereinbefore, the resulting polymeric composition has chemically combined therein a Diels-Alder adduct of perchlorocoumalin and the carboxylic compound containing aliphatic carbon-to-carbon unsaturation. The Diels-Alder adduction of perchlorocoumalin with the unsaturated polymeric molecules can be carried out under conditions similar to those described for the reaction of perchlorocoumalin with carboxylic compounds. In the case of the reactions involving polymeric molecules, it is desired to carry out the reaction in the liquid phase. If the polymers are not sufficiently fluid, a solvent can be used. Maintaining a fluid system facilitates the evolution of the carbon dioxide formed in the adduction reaction.

It is significant to note that the cross-linking of polymers with perchlorocoumalin does not require the aid of a catalyst, such as are generally required for cross-linking with vinyl monomers such as styrene.

A typical preparation in accordance with this aspect of the invention follows: An unsaturated polyester resin comprised of the reaction product of maleic anhydride and diethylene glycol is reacted with perchlorocoumalin at a temperature of about 150 degrees centigrade for six hours. The perchlorocoumalin is used in an amount sufficient to provide two moles of perchlorocoumalin for each mole of polyester resin. Carbon dioxide is driven off during the reaction. A cross-linked, chlorine-containing polymer is obtained as the product of the process. The resinous product is suitable for use as a molding compound.

A highly viscous resin can be used as the starting material so that the polymer gels before the carbon dioxide evolves from the reaction mixture. A foamed product results.

In another preparation, cis-polybutadiene rubber is dissolved in ortho-dichlorobenzene at a temperature of 150 degrees centigrade. To a solution containing one mole of polymer is added three moles of perchlorocoumalin. The reaction proceeds at 150 degrees centigrade for six hours. The solvent is evaporated from the reaction product and a chlorine-containing polymeric product is recovered which is suitable for use in preparing coatings.

The foregoing preparation is readily modified by first reacting the cis-polybutadiene with a sufficient amount of perchlorocoumalin to adduct two moles of perchlorocoumalin per one mole of polymer. The carbon dioxide evolved during the reaction is driven off from the polymer solution. Thereafter, the solvent is also removed. Then the thus-treated polymer is reacted with bis(2-hydroxyethyl) maleate to form a cross-linked polymer.

In general, the reactants are employed in a ratio of one equivalent of perchlorocoumalin for two equivalents of carbon-to-carbon unsaturation in the polymer for each cross-link desired between polymer molecules.

The following examples illustrate the preparation of a Diels-Alder adduct of percholorcoumalin and carboxylic compounds.

Example 1

A three-necked, round bottom flask was charged with 35 grams of perchlorocoumalin, 14.7 grams of maleic anhydride, and 25 grams of chlorobenzene as a solvent therefor. The flask was fitted with a thermometer, nitrogen inlet tube and a reflux condenser. A tube containing calcium chloride was attached to the top of the condenser and the calcium chloride tube in turn led to a trap containing about three hundred ml. of water. The purpose of the trap was to catch any HCl that may be evolved from the reaction mixture. The reaction mixture was heated to about 152 degrees centigrade for approximately two days, and at the end of this time, the reaction mixture had become darkened and large crystals were present in the bottom of the flask. The system was cooled, flushed with nitrogen, and the large cystals isolated by filtration, washed with benzene and dried.

The product was analyzed and found to be the tetrabasic dianhydride, 1,4,7,8-tetrachloro-(2.2.1)-bicyclo-7-octene-2,3,5,6-tetracarboxylic dianhydride, hereinafter referred to as the dianhydride adduct. The compound is shown as follows:

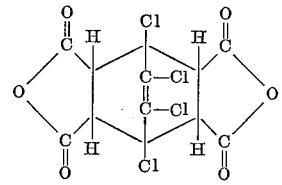

It is an odorless, colorless, or very light amber solid, partially soluble in acetone, ethyl acetate, toluene and carbon tetrachloride. Its molecular weight is three hundred and eighty-six and it melts with decomposition at three hundred and twenty degrees centigrade.

*Analysis.*—Calculated for $C_{12}Cl_4O_6$: Cl, 36.7%; equivalent weight, 96.5. Found: Cl, 36.4%; equivalent weight, 98.7.

The example which follows illustrates an improved method of preparing the dianhydride adduct.

Example 2

A flask fitted with a thermometer and distillation apparatus was charged with 2653 grams of maleic anhydride and one litter of dried chlorobenzene. The chlorobenzene was distilled until the distillate was clear, i.e., no more water in the distillate, thereby insuring the conversion of any maleic acid present to maleic anhydride. Distillation was continued until the flask temperature reached one hundred and fifty degrees centigrade. After a reflux condenser was substituted for the distillation apparatus, 1056 grams of perchlorocoumalin was added and the temperature was held at about 150 degrees centigrade until carbon dioxide evolution ceased. The total reaction time was about ten hours. The flask was cooled to about 75 degrees centigrade and about 2.5 liters of benzene was added. The solid dianhydride adduct was isolated by filtration, washed with boiling benzene, recrystallized from a benzene-acetone solution, and dried in an oven at 150 degrees centigrade. The yield of dianhydride adduct thus obtained was 1410 grams.

Example 3

A flask containing 234 grams of perchlorocoumalin, 87 grams of methyl acrylate and 1.25 grams of hydroquinone as a stabilizer was heated between one hundred and fifteen degrees centigrade and one hundred and fifty degrees centigrade, for six hours. Recrystallization from n-hexane yielded one hundred and ninety-seven grams of methyl 2,3,4,5-tetrachloro-1,2-dihydrobenzoate, M.P. seventy-four to seventy-six degrees centigrade.

*Analysis.*—Calculated for $C_8H_6Cl_4O_2$: Cl, 51.4%. Found: Cl, 50.6%. Its structural formula is the following:

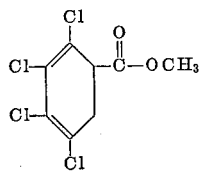

temperature. The ratio of anhydride to epoxide equivalents was 1.0. Fiberglas cloth was impregnated with this solution, and dried in an oven at 100 degrees centigrade for two to four minutes. A laminate was prepared by pressing twelve sheets of the cloth as treated above at 178 to 180 degrees centigrade for one hour. The laminate was post-cured for four hours at 180 degrees centigrade in a mechanical convection oven.

Additional laminates were prepared in which the ratios of anhydride to epoxide equivalents were 0.85 and 0.70. Test results obtained with all the laminates are shown in Table 1.

TABLE 1

| | Test Temperature, °F. | Example No. | | |
|---|---|---|---|---|
| | | 5 | 6 | 7 |
| Ratio of Anhydride to Epoxide Equivalents. | | 1.0 | 0.85 | 0.70 |
| Flexural Strength, p.s.i.[a] | Room Temperature | 77,360 | 84,850 | 87,720 |
| Flexural Modulus, p.s.i.[a] | do | $3.37 \times 10^6$ | $3.78 \times 10^6$ | $3.66 \times 10^6$ |
| Flexural Strength, p.s.i. | 350 | 10,050 | 9,170 | 6,880 |
| Flexural Modulus, p.s.i. | 350 | $0.93 \times 10^6$ | $1.10 \times 10^6$ | $0.83 \times 10^6$ |
| Flexural Strength, p.s.i. | 500 | 5,190 | 8,250 | 8,400 |
| Flexural Modulus, p.s.i. | 500 | $0.71 \times 10^6$ | $1.27 \times 10^6$ | $1.12 \times 10^6$ |
| Dielectric Constant[b] | | | 4.59 | |
| Dissipation Factor[b] | | | 0.010[6] | |
| Insulation Resistance[c] | | | $1.25 \times 10^{12}$ | |

[a] Determined by ASTM D-790-49T.
[b] Determined by ASTM D-150-54T.
[c] Determined by ASTM D-257-54T.

Example 4

A suspension of 100 grams perchlorocoumalin and 82.2 grams cyclopentadiene was stirred with 50 ml. low boiling petroleum ether at reflux. All solids went into solution in fifteen minutes and then after one half hour the solid adduct separated. The mono-adduct weighing 117 grams and having a melting point of 105–107 degrees was collected. This adduct (58.9 grams) was then treated with 19.3 grams maleic anhydride and 100 ml. chlorobenzene, and, after heating to 110 degrees centigrade, $CO_2$ was slowly evolved. After two hours the temperature was raised to 140 degrees centigrade. Heating was continued for one and one-half hours until $CO_2$ evolution ceased. Upon cooling a crystalline solid was collected which weighed twenty-three grams, and which had a melting point of 195–197 degrees.

*Analysis.*—Calculated for $C_{13}H_8Cl_4O_3$: Cl, 40.4%. Found: Cl, 39.9%. This product is the mixed adduct of perchlorocoumalin 4,7,8,9 - tetrachloro - 2,7 - etheno-3a,4,5,6,7,7a-hexahydroindene-5,6-dicarboxylic anhydride having the following formula:

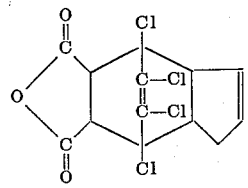

The following examples illustrate the utility of the perchlorocoumalin adducts in the plastics industry.

The following examples show the utility as a hardener for epoxy compounds.

Examples 5 to 7

A solution of 180 grams of the dianhydride adduct of Example 1, 200 grams of Araldite 6020, a liquid epoxy resin marketed by Ciba Company and comprising the reaction product of epichlorohydrin and 4,4′-dihydroxy-diphenylmethane, and 360 grams of methyl ethyl ketone was heated and stirred vigorously for four hours at the reflux

Examples 8 to 13

Castings were prepared by dissolving the dianhydride adduct of Example 1, and and an auxiliary carboxylic anhydride in an epoxy resin comprising the reaction product of epichlorohydrin and 4,4′-dihydroxydiphenylmethane. The ratio of dianhydride adduct to auxiliary anhydride was 1 to 1 in all examples. The total anhydride content of the castings was 32.5 weight percent. In Examples 8, 9, and 10, the auxiliary anhydride was maleic anhydride. In Examples 11, 12, and 13, the auxiliary anhydride was phthalic anhydride. The castings were cured at several different temperatures as indicated in Table 2. The heat distortion temperatures of the castings were determined and are also recorded in Table 2. Comparison is made with the same epoxy resin when cured with a commercial anhydride curing agent.

TABLE 2

| Example No. | Curing Temperature, °C. | Heat Distortion Temperature (°C.) |
|---|---|---|
| 8 | 120 | 156 |
| 9 | 150 | 190 |
| 10 | 180 | 199 |
| 11 | 120 | 131 |
| 12 | 150 | 176 |
| 13 | 180 | 175 |
| (1) | 180 | 196 |

[1] Commercial anhydride curing agent.

The following example shows the preparation of polyesters.

Example 14 twenty minutes in a 150 degree centigrade oil bath, after which time a polyester gell formed which was suitable for the prepartion of castings.

Numerous types of additives can be incorporated into the polymeric compositions of the invention depending on the nature of the polymer and the desired end use. Frequently used are reinforcing agents such as fibers in the form of cloth, mat, chopped strands, or staple. Such fibers can be of mineral origin such as glass and asbestos;

of vegetable orgin such as sisal and cotton; or animal orgin such as wool. Synthetic fibers such as the linear polyester fibers, or metal fibers such as aluminum or steel can also be used to advantage. Following are typical fillers that can be used in the polymeric compositions: inorganic materials such as alumina, silica, calcium carbonate, iron oxide, titanium dioxide, and asbestos; and organic materials such as wood flour, cotton and rayon flock, sisal fibers and dyes. At times it is desirable to incorporate plasticizers such as dioctyl phthalate, or light stabilizers such as 2-hydroxybenzophenone, or fire retardants such as antimony oxide.

It is also within the scope of the invention to employ the polymers described herein in combination with other polymers to provide desirable combinations of properties in particular applications.

This invention may be embodied in other forms or carried out in other ways, without departing from the spirit or essential characteristics thereof. The present embodiment is therefore to be considered as in all respects illustrative, and not restrictive.

I claim:

1. An organic polymeric composition of a polymer selected from the group consisting of an epoxy resin, a polyester resin of a polycarboxylic compound and a polyhydric alcohol, a polymer of an alkene, and a polymer of a cycloalkene having up to two fused rings, said composition having chemically combined therein a Diels-Alder adduct of perchlorocoumalin and an olefinic compound selected from the group consisting of alkenes, cycloalkenes having up to two fused rings, carboxylic compounds containing aliphatic carbon-to-carbon unsaturation and selected from the group consisting of a carboxylic acid, a carboxylic anhydride, a carboxylic acid ester and a carboxylic acid halide, and mixtures thereof.

2. A composition comprising an epoxy resin and a Diels-Alder adduct of perchlorocoumalin and a carboxylic compound containing aliphatic carbon-to-carbon unsaturation and selected from the group consisting of a carboxylic acid, a carboxylic anhydride, a carboxylic acid ester and a carboxylic acid halide.

3. A composition comprising an epoxy resin and a Diels-Alder adduct of perchlorocoumalin and a carboxylic anhydride containing aliphatic carbon-to-carbon unsaturation.

4. The composition according to claim 3 wherein said adduct is 1,4,7,8-tetrachloro-(2.2.1)-bichyclo-7-octene-2,3,5,6-tetracarboxylic dianhydride.

5. The cured reaction product of components comprising an epoxy resin, and a Diels-Alder adduct of perchlorocoumalin and a carboxylic compound containing aliphatic carbon-to-carbon unsaturation and selected from the group consisting of a carboxylic acid, a carboxylic anhydride, a carboxylic acid ester and a carboxylic acid halide.

6. The cured reaction product of components comprising an epoxy resin, and a Diels-Alder adduct of perchlorocoumalin and a carboxylic anhydride containing aliphatic carbon-to-carbon unsaturation.

7. The composition according to claim 6 wherein the adduct is 1,4,7,8-tetrachloro-(2.2.1)-bicyclo-7-octene-2,3,5,6-tetracarboxylic dianhydride.

8. A polyester resin comprised of the reaction product of a polycarboxylic compound and a polyhydric alcohol, and having chemically combined therein a Diels-Alder adduct of perchlorocoumalin and a carboxylic compound containing aliphatic carbon-to-carbon unsaturation and selected from the group consisting of a carboxylic acid, a carboxylic anhydride, a carboxylic acid ester and a carboxylic acid halide.

9. A polyester resin comprising the reaction product of a polyhydric alcohol, and a Diels-Alder adduct of perchlorocoumalin and a carboxylic compound containing aliphatic carbon-to-carbon unsaturation and selected from the group consisting of a carboxylic acid, a carboxylic anhydride, a carboxylic acid ester and a carboxylic acid halide.

10. The polyester resin of claim 9 wherein said adduct is 1,4,7,8 - tetrachloro - (2.2.1) - bicyclo - 7 - octene-2,3,5,6-tetracarboxylic dianhydride.

11. The process which comprises the steps of (1) providing a mixture of an epoxy resin, a curing catalyst, and a Diels-Alder adduct of perchlorocoumalin and a carboxylic compound containing aliphatic carbon-to-carbon unsaturation and selected from the group consisting of a carboxylic acid, a carboxylic anhydride, a carboxylic acid ester and a carboxylic acid halide; and (2) curing the mixture at a temperature up to 250 degrees centigrade.

12. The process according to claim 11 wherein said adduct is 1,4,7,8-tetrachloro-(2.2.1)-bicyclo-7-octene-2,3,5,6-tetracarboxylic dianhydride.

13. A process for preparing a polyester resin which comprises reacting a polyhydric alcohol with a Diels-Alder adduct of perchlorocoumalin and a carboxylic compound containing aliphatic carbon-to-carbon unsaturation and selected from the group consisting of a carboxylic acid, a carboxylic anhydride, a carboxylic acid ester and a carboxylic acid halide, at a temperature of about 250 degrees centigrade.

14. The process of claim 13 wherein said adduct is 1,4,7,7 - tetrachloro - (2.2.1) - bicyclo - 7 - octene-2,3,5,6-tetracarboxylic dianhydride.

15. The process which comprises reacting perchlorocoumalin with a polymer which contains aliphatic carbon-to-carbon unsaturation and which is selected from the group consisting of an unsaturated polyester resin of a polycarboxylic compound and a polyhydric alcohol, a polymer of an alkene, and a polymer of a cycloalkene having up to two fused rings, to form a cross-linked polymer.

16. The process of claim 15 wherein the polymer is unsaturated polyester resin of a polycarboxylic compound and a polyhydric alcohol.

17. The process of claim 15 wherein the polymer is cross-linked in the presence of carbon dioxide evolved during the reaction with perchlorocoumalin to form a cross-linked, foamed, polymer product.

18. The process according to claim 15 which comprises reacting perchlorocoumalin with said linear polymer which contains carbon-to-carbon double bonds to form a linear Diels-Alder polymeric reaction product, cooling the resulting reaction mixture to stop the reaction, shaping said reaction mixture, and heating said reaction mixture to form a shaped, cross-linked polymer.

No references cited.

MURRAY TILLMAN, *Primary Examiner.*

N. F. OBLON, *Assistant Examiner.*

UNITED STATES PATENT OFFICE
CERTIFICATE OF CORRECTION

Patent No. 3,274,131                      September 20, 1966

Edward Leon

It is hereby certified that error appears in the above numbered patent requiring correction and that the said Letters Patent should read as corrected below.

Column 1, lines 44 to 50, the formula should appear as shown below instead of as in the patent:

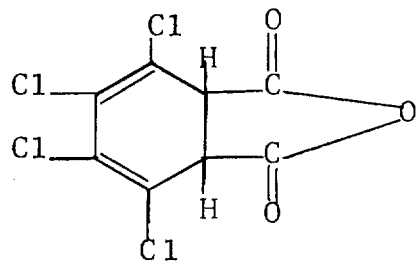

line 40, for "anhydide" read -- anhydride --; line 68, for "maletic" read -- maleic --; column 2, line 2, for "per mole" read -- per one mole --; column 5, line 44, for "isophtnalic" read -- isophthalic --; column 6, line 27, for "touene" read -- toluene --; column 7, line 71, for "1-methyl-1-penyl" read -- 1-methyl-1-phenyl --; column 8, line 47, for "hardned" read -- hardened --; column 8, line 57, for "R-C=-RC" read -- R-C=C-R --; column 10, line 4, for "perchlorcoumalin" read -- perchlorocoumalin --; line 22, for "cystals" read -- crystals --; line 42, for "$C_{12}Cl_4O_6$" read -- $C_{12}H_4Cl_4O_6$ --; line 51, for "litter" read -- liter --;

column 12, line 2, for "Fiberglas" read -- Fiberglass --; columns 11 and 12, TABLE 1, third column, line 3 thereof, for "3.37×1C$^6$" read -- 3.37×10$^6$ --; same TABLE 1, first column, line 11 thereof, after "resistance$^C$" strike out the quotation mark; column 12, line 43, for "and and" read -- and --; line 67, before "twenty minutes" insert -- To 10.0 parts of the dianhydride adduct obtained in Example 2, was added 5.17 parts of bis(2-hydroxyethyl) maleate. The solution was warmed for approximately --; line 69, for "prepartion" read -- preparation --; column 13, lines 1 and 2, for "orgin" , each occurrence, read -- origin --; line 47, for "-bichyclo-" read -- -bicyclo- --; column 14, line 4, for "of carboxylic" read -- of a carboxylic --; line 37, for "1,4,7,7-" read -- 1,4,7,8- --.

Signed and sealed this 24th day of June 1969.

(SEAL)
Attest:

EDWARD M. FLETCHER, JR.
Attesting Officer

WILLIAM E. SCHUYLER, JR.
Commissioner of Patents